United States Patent
Gourrier et al.

[19]

[11] Patent Number: 6,015,234
[45] Date of Patent: Jan. 18, 2000

[54] NON-CONTACTING TEMPERATURE MEASURING DEVICE

[75] Inventors: Serge Gourrier, Paris; Jean-Pierre Hazan, Sucy, both of France

[73] Assignee: U.S. Philips Corporation, New York, N.Y.

[21] Appl. No.: 08/812,224

[22] Filed: Mar. 6, 1997

[30]     Foreign Application Priority Data

Mar. 6, 1996 [FR] France ................................ 96 02814

[51] Int. Cl.[7] .................................................. G01K 7/00
[52] U.S. Cl. ............................................. 374/164; 374/32
[58] Field of Search .................................. 374/121, 164, 374/32

[56]            References Cited

U.S. PATENT DOCUMENTS

| | | | |
|---|---|---|---|
| 3,665,762 | 5/1972 | Domen | 73/190 R |
| 3,745,360 | 7/1973 | Paul | 250/83.3 |
| 4,687,342 | 8/1987 | Betzler et al. | 374/32 |
| 5,054,936 | 10/1991 | Fraden | 374/164 |

FOREIGN PATENT DOCUMENTS

| | | |
|---|---|---|
| 2607806A1 | 9/1977 | Germany . |
| 2607806C2 | 9/1977 | Germany . |

*Primary Examiner*—Christopher W. Fulton
*Assistant Examiner*—Quyen Doan
*Attorney, Agent, or Firm*—David R. Treacy

[57]          ABSTRACT

A device (5) for measuring temperatures without mechanical contact comprises a bolometer with thermistors ($20_1$, $20_2$, $20_3$, $20_4$) arranged as a Wheatstone bridge. Some of the thermistors (202, 204) are shielded and some of the thermistors ($20_1$, $20_3$) are not shielded so as to allow or not to allow them, respectively, to receive thermal radiation (25) from an object (OBJ). The thermal radiation heats the non-shielded thermistors and produces an unbalance (v) of the bridge. This unbalance is canceled by heating all the thermistors by an additional heating (18, 26). In the balanced state the temperature of the object is equal to that of the thermistors. The additional heating is preferably achieved by causing the electric power supplied to the bridge to be varied. Computing means (14) enable the temperature of the object to be derived from current/voltage ratios relating to the thermistors.

9 Claims, 1 Drawing Sheet

NON-CONTACTING TEMPERATURE MEASURING DEVICE

BACKGROUND OF THE INVENTION

1. Field of the Invention

The invention relates to a device for measuring temperatures without mechanical contact, comprising a bolometer arranged as a Wheatstone bridge, a power supply connected to a diagonal arm of the bridge, and a detector for measuring an unbalance voltage in another diagonal arm of the bridge. The bolometer comprises elements sensitive to temperature variations, some of the elements being shielded and some of the elements being not shielded so as to allow or not to allow, respectively, the temperatures of the elements to be changed by the net thermal radiation between said elements and an object arranged opposite the bolometer, and further comprises an element or arrangement for producing additional heating of the elements.

The device can be used for temperature measurements without mechanical contact in a variety of uses.

A bolometer is a thermal detector which absorbs radiation and transforms this into heat, which causes the temperature of the bolometer to rise. A property of the bolometer, generally its electrical resistance, varies with the temperature, which enables the intensity of the radiant flux incident on the bolometer to be measured. Thus, when the radiation emanates from a hot body placed in front of the bolometer, it is possible to determine the temperature of the hot body.

2. Description of the Prior Art

A common bolometer configuration is that of a Wheatstone bridge including a thermistor, i.e. a temperature-sensitive component, intended to receive the radiation, and three other components, which are shielded from the radiation. The three other components are used as references in order to compensate for temperature variations to which the sensing element is subjected. Generally, the bridge is balanced in the absence of radiation, the two bridge arms which are energized in parallel having equal resistances. The optimum sensitivity is obtained when the components forming the bridge have electrical resistances equal to or close to one another.

A temperature measurement device based on this principle is described in the document DE 26 07 806. It includes a bolometer comprising a single thermistor and 3 fixed resistors which are insensitive to temperature variations. The device has a high detection sensitivity in combination with a low power consumption and it does not require any thermostatic device to adjust the bolometer in the absence of radiation. For automatic adjustment of the bridge when it is put into operation, the thermistor is heated by varying the current through the bridge, in accordance with said document. On the basis of measurements of the unbalance voltage of the bridge, a feedback circuit causes the bridge current to be varied so as to balance and thus adjust the bolometer and make it ready for use. Subsequently, the radiation flux is varied at a given rate so as to generate an unbalance signal at the same rate.

For processing of the measurement signal, correction circuits enable the unbalance signal to be corrected by making allowance for the current through the bridge which causes a rise in the thermistor temperature due to the adjustment. However, such a temperature measuring device provides measurements which are still inaccurate because they do not allow for the emissivity factors which distinguish the bolometer from the body emitting the radiation.

SUMMARY OF THE INVENTION

It is the object of the invention to improve the accuracy of the measurements of the temperature of an object effected by means of a bolometer.

This object is achieved by means of a device in which:

the bolometer comprises two shielded elements and two non-shielded elements, which are respectively arranged diagonally opposite one another in the bridge, the element or arrangement for additional heating is capable of causing the temperatures of the elements to vary until equality in temperature is achieved between the non-shielded elements and the object, the equality in temperature being measured by detecting, by the detector, cancellation of the unbalance voltage, and the device comprises temperature measuring means for determining the temperature, common to the non-shielded elements and to the object, at which cancellation of the unbalance voltage is achieved.

Thus, the non-shielded components are exposed to the influence of the radiation and, after thermal equilibrium between the exchanged radiative heat fluxes has been reached, and the unbalance voltage has been compensated for under the influence of the additional heating which is effected independently of the emissivities of the object and of the shielded components, the temperature of the shielded components is equal to the temperature of the object. Preferably, the additional heating is achieved by causing the electric power dissipated by the power supply for the bridge to be varied. Therefore, it is not necessary to carry out a calibration in order to adapt the bolometer to the emissivity characteristics of the object to be examined. Besides, such a calibration is a source of inaccuracy.

Preferably, a thermistor of an identical type is used for the shielded components and the non-shielded components.

These and further aspects of the invention will be apparent from and will be elucidated on the basis of embodiments described hereinafter.

The invention will be more fully understood with the aid of the drawing FIGURES, given by way of non-limitative examples.

DESCRIPTION OF THE PREFERRED EMBODIMENT

Figure 1:
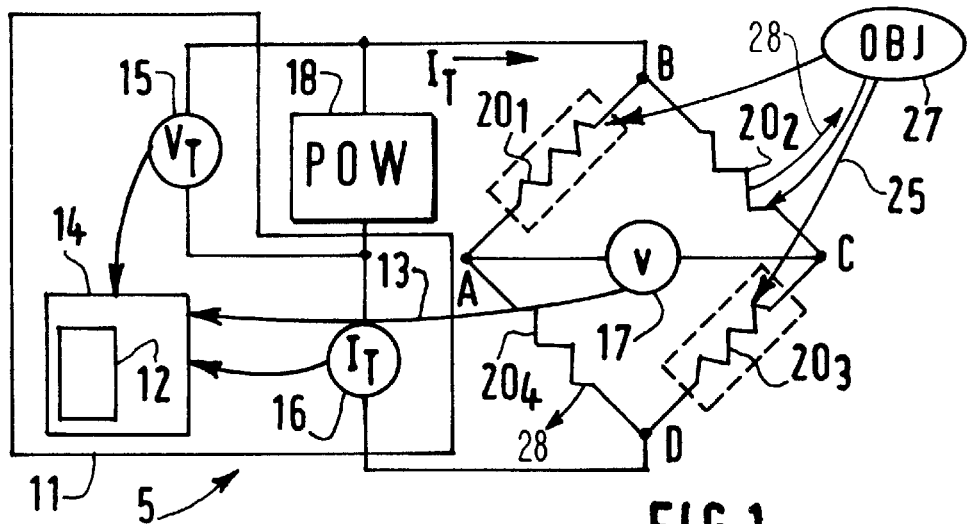
FIG. 1 is an electrical schematic diagram of a temperature measuring device comprising a bolometer in bridge arrangement.

FIG. 1 shows an electrical diagram of a temperature measuring device 5 comprising:

a bolometer in a Wheatstone bridge arrangement comprising four thermistors $20_1$, $20_2$, $20_3$, $20_4$, a power supply POW 18 for powering the bridge, and a detector 17 for measuring a bridge unbalance voltage v.

The power supply 18 is connected to a diagonal bridge arm BD and the detector 17 is connected to another diagonal bridge arm AC.

In a preferred embodiment the four thermistors 201, 202, $20_3$, $20_4$ are identical and are made in similar fabrication processes. The thermistors situated in facing arms of the bridge, for example the thermistors $20_2$ and $20_4$, are shielded from the effect of the radiation 25 emitted by an object 27. The thermistors $20_1$, and $20_3$ situated in the other arms are not shielded and are absorbent or have an absorbent layer for receiving and absorbing the radiation.

When the bolometer is at a uniform temperature the Wheatstone bridge is in balance and the unbalance voltage v of the bridge is consequently null. In practice, in the absence of the object, a supply current is used which is so low that the thermistors are not heated. When the bolometer is exposed to the radiation 25 the non-shielded thermistors will absorb the radiation and their temperature will rise. This results in a non-zero unbalance voltage v. In accordance with the invention, heat is now applied to the bolometer to restore the balance of the bridge. For example, the supply current of the bridge is changed in such a manner that electric power is dissipated in the four thermistors. The bridge will be in balance again when the non-shielded thermistors $20_1$, $20_3$ radiate as much energy 28 as they receive via the radiation 25. At this instant the four thermistors as well as the object are at the same temperature. Since there is thermal balance between the object and the non-shielded thermistors, the emissivities of the object and the thermistors will not affect this equilibrium. This applies insofar as the non-shielded thermistors essentially receive only the radiation from the object and do not receive any stray radiation from the environment. It is thus possible to determine the temperature of the object on the basis of the temperature of the thermistors by avoiding the influence of the above-mentioned parameters such as emissivity, which was not possible heretofore.

Figure 2A:
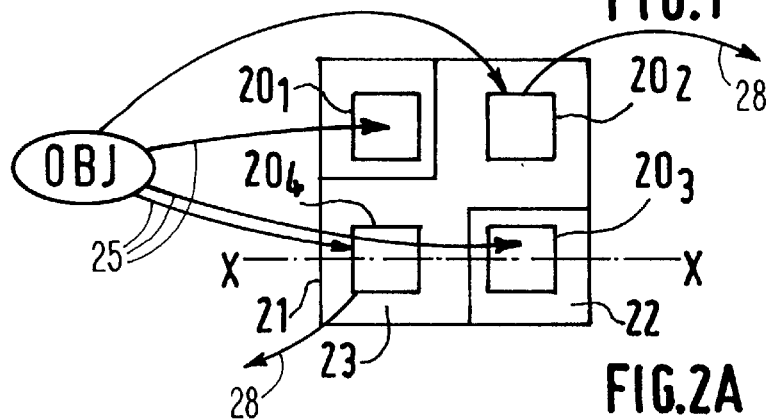
FIG. 2A is a plan view of a bolometer according to the invention with two components shielded and two components not shielded.
Figure 2B:
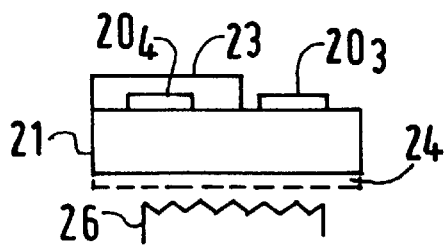
FIG. 2B is a a sectional view of the bolometer of FIG. 2A.

The additional heating of the thermistors can be realized by direct heating in that the electric supply current in the thermistors is increased, or also by heating via conduction by means of an additional heating element 26 which is electrically isolated from the thermistors (FIG. 2B).

The device comprises a circuit arrangement 11 for measuring the temperature of the thermistors, including circuit 16 for measuring the value of the supply current and circuit 15 for measuring the value of the supply voltage. When the unbalance voltage has become zero these values are $I_T$ and $V_T$, respectively. To determine the values $I_T$ and $V_T$ the detector supply a control signal 13, which actuates calculator 14. The calculator determines a ratio $R = V_T/I_T$, which is the value of the electrical resistance common to all the thermistors in the case of a bridge comprising identical components. Since the variations in the electrical resistance of the thermistors are known by prior calibration, it is thus possible to use a look-up table 12 in order to find the temperature of the thermistors and, as a consequence, that of the object. The look-up table 12 may form part of the calculator 14.

FIGS. 2A and 2B show an example of a physical structure of the bolometer. FIG. 2B is a sectional view taken on the line XX. On a substrate 21 four thermistors are formed, for example, as four zones of a vacuum-deposited thin-film material having a temperature coefficient suitable for the formation of a thermistor. Subsequently, a layer 23 of a reflecting material is deposited onto this assembly, in which layer openings 22 are formed to allow radiation to fall onto thermistors $20_1$, $20_3$. By forming all the thermistors substantially during a similar fabrication process it is assured that they have identical characteristics. Thus, the bridge is in balance by virtue of its construction if there is no radiation at all. The non-shielded elements should be sufficiently close to the corresponding shielded elements so as to avoid thermal asymmetries not caused by the absorption of useful radiation but, for example, by non-uniformity of the thermal environment. However, the shielded elements should be satisfactorily thermally insulated from the non-shielded elements in order to ensure that the heating of the non-shielded elements by the useful radiation cannot propagate to the shielded elements. For example, in order to preclude thermal asymmetries caused by the thermal environment, the substrate 21 can be arranged on a support 24 having a sufficiently high thermal conductivity.

Figure 3:
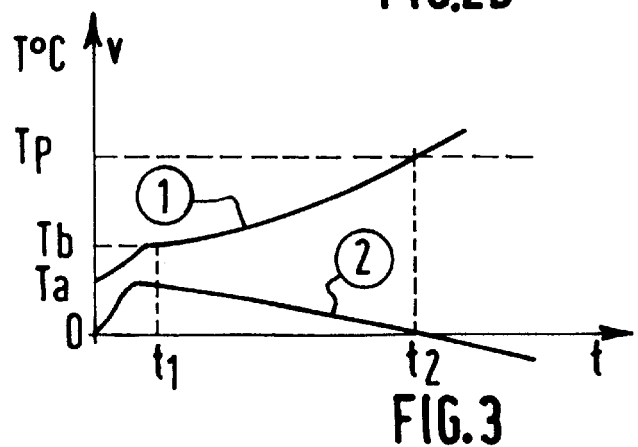
FIG. 3 is a graph showing the temperature variations of the non-shielded thermistors and the variations of the unbalance voltage during the temperature balancing process.

FIG. 3 shows a curve 1 representing the variations in the temperature of a non-shielded thermistor and a curve 2 representing the variations of the unbalance voltage v as a function of the time t. In the absence of radiation the bridge is in balance and the unbalance voltage is zero, v=0. All the thermistors are at the same temperature Ta. At the instant t=0 the non-shielded thermistors are exposed to the radiation 25 emanating from the object 27 having a temperature $T_p$. As a result of this, the temperature of the non-shielded thermistors rises to the temperature $T_b$ (instant $t_1$). This causes a bridge unbalance voltage to appear. The additional heating is then started, either by activating the additional heating element or by adapting the electric power dissipated in the thermistors by the power supply means 18. The variations may be variations, combined or not combined, imposed on the supply current or on the supply voltage.

The thermistors will thus be heated, particularly those which receive the radiation will be heated, for example, in accordance with the curve 1. The differences in temperature between the thermistors decrease, the unbalance voltage decreases and becomes zero (instant $t_2$) when the temperature of the thermistors is equal to that of the object, the thermal fluxes exchanged between the object and the non-shielded thermistors being balanced. At the instant $t_2$ the values of the supply current $I_T$ and the supply voltage $V_T$ are determined in order to be processed as described hereinbefore.

If the fabrication process of the thermistors gives rise to differences between the electrical resistance values, this results in a residual unbalance voltage when the bolometer is at a uniform temperature. The principle of restoring the balance of the bridge remains similar to that described hereinbefore, with the restriction that restoring the balance by the additional heating is achieved when the unbalance voltage again reaches the value of the residual voltage.

It is possible to use the unbalance voltage to control the electric power dissipation in the thermistors so as to reduce the time required by the bolometer to reach the thermal equilibrium described hereinbefore.

Conversely, it is possible to determine the instant at which the temperature of an object reaches a predetermined value. For this purpose, values of the supply voltage V and the supply current I are given, as a result of which the value of the ratio R=V/I is given. When the unbalance voltage passes through a value zero the thermal equilibrium has been reached between the object and the non-shielded thermistors.

We claim:

1. A device (5) for measuring temperatures without mechanical contact, comprising a bolometer arranged as a Wheatstone bridge, power supply means (18) connected to a diagonal arm of the bridge, and detection means (17) for measuring an unbalance voltage (v) in another diagonal arm of the bridge, the bolometer comprising elements ($20_1$, $20_2$, $20_3$, $20_4$) sensitive to temperature variations, some of the elements ($20_2$, $20_4$) being shielded and some of the elements ($20_1$, $20_3$) being not shielded so as to allow or not to allow, respectively, the temperatures of the elements to be changed by net thermal radiation (25) between said elements and an object (27) arranged opposite the bolometer, and further comprising heating means (26, 18) for producing additional heating of the elements, characterized in that:

the bolometer comprises two shielded elements ($20_2$, $20_4$) and two non-shielded elements ($20_1$, $20_3$), which are respectively arranged diagonally opposite one another in the bridge, the heating means causes the temperatures of the elements ($20_1$, $20_2$, $20_3$, $20_4$) to vary until the detection means (17) produces a null unbalance voltage (v), thereby indicating that equality in temperature is achieved between the non-shielded elements ($20_1$, $20_3$) and the object, the device (5) comprises temperature measuring means (11) for determining the temperature, common to the non-shielded elements and to the object, at which cancellation of the unbalance voltage is achieved.

2. A device as claimed in claim 1, characterized in that the shielded elements and the non-shielded elements have the same electrical resistance when their temperature is the same.

3. A device as claimed in claim 2, characterized in that the bolometer comprises four identical thermistors, the temperature measuring means (11) includes means for measuring a value of the supply current (16) and a value of the supply voltage (15) which cause the cancellation of the unbalance voltage (v) when the object (27) is present opposite the bolometer, a calculator (12, 14), for computing a ratio between said voltage value and said current value and deriving, on the basis of this ratio, the temperature of the object.

4. A device as claimed in claim 1, characterized in that the heating means causes electric power dissipated by the power supply means (18) of the bridge to be varied.

5. A device as claimed in claim 4, characterized in that the shielded elements and the non-shielded elements have the same electrical resistance when their temperature is the same.

6. A device as claimed in claim 5, characterized in that the bolometer comprises four identical thermistors, the temperature measuring means (11) includes means for measuring a value of the supply current (16) and a value of the supply voltage (15) which cause the cancellation of the unbalance voltage (v) when the object (27) is present opposite the bolometer, a calculator (12, 14), for computing a ratio between said voltage value and said current value and deriving, on the basis of this ratio, the temperature of the object.

7. A device as claimed in claim 1, characterized in that the heating means comprises an additional heating means (26).

8. A device as claimed in claim 7, characterized in that the shielded elements and the non-shielded elements have the same electrical resistance when their temperature is the same.

9. A device as claimed in claim 8, characterized in that the bolometer comprises four identical thermistors, the temperature measuring means (11) includes means for measuring a value of the supply current (16) and a value of the supply voltage (15) which cause the cancellation of the unbalance voltage (v) when the object (27) is present opposite the bolometer, a calculator (12, 14) for computing a ratio between said voltage value and said current value and deriving, on the basis of this ratio, the temperature of the object.

* * * * *